Aug. 26, 1952     W. C. GOODMAN     2,608,198
COMBINATION VEHICLE COVER AND TENT
Filed May 5, 1949     2 SHEETS—SHEET 1
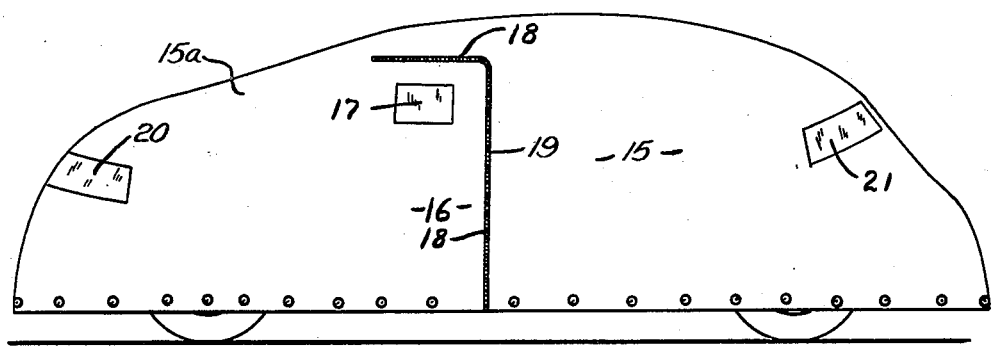
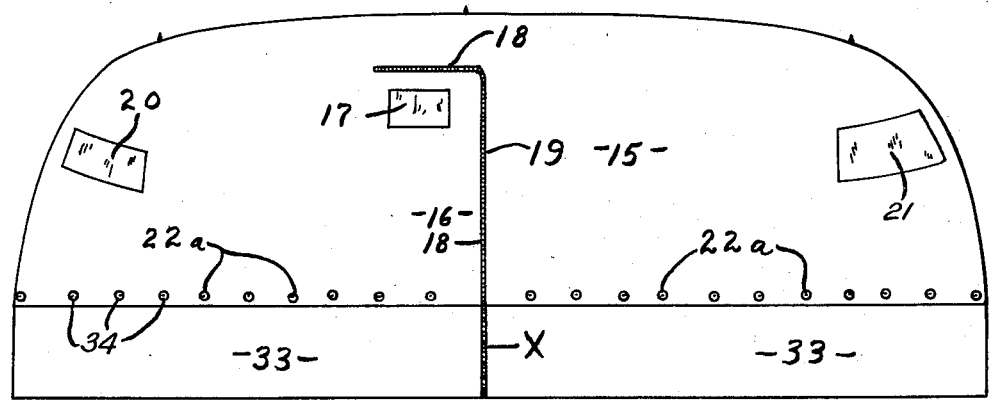
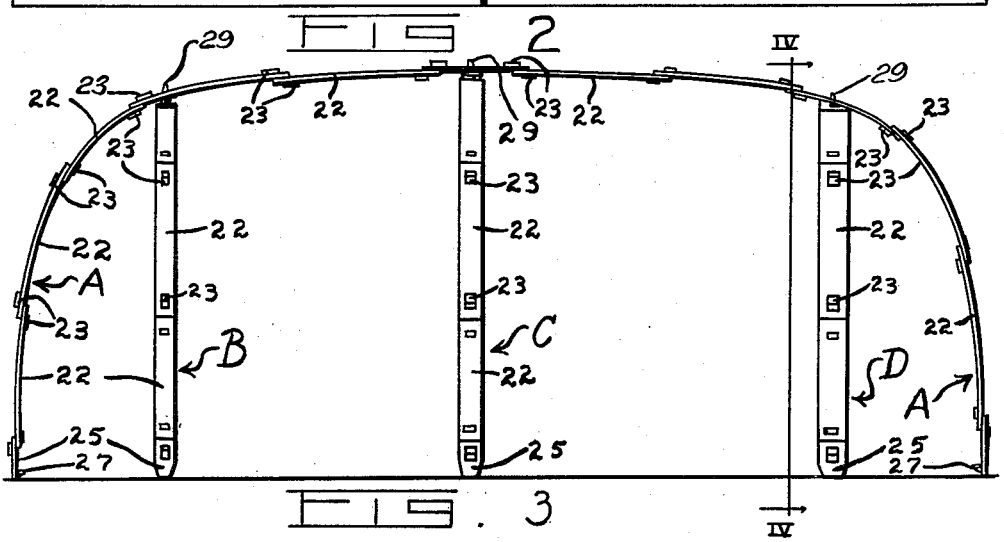
INVENTOR.
WILLIAM C. GOODMAN
BY M. Y. Charles
ATTORNEY.

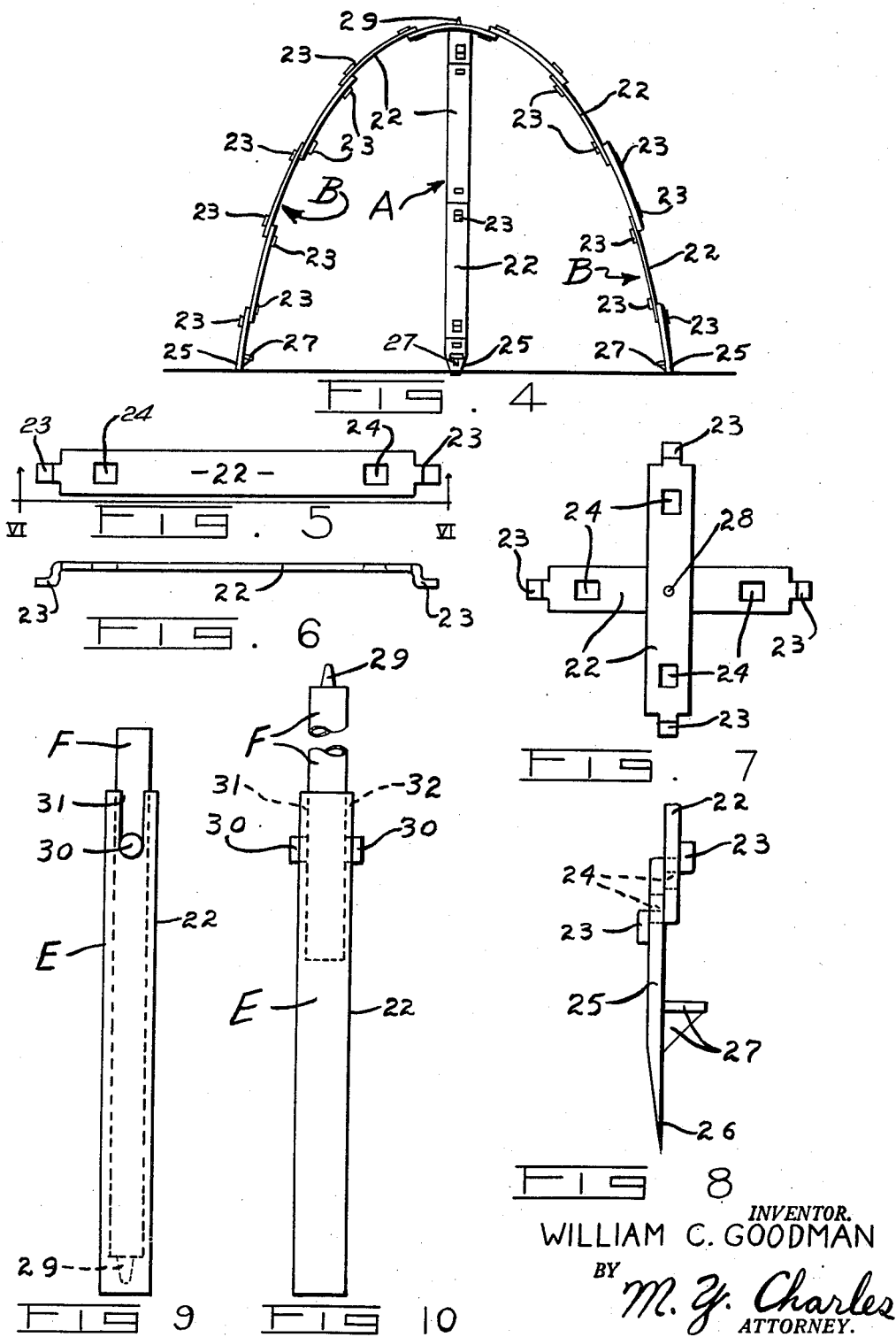

Patented Aug. 26, 1952

2,608,198

UNITED STATES PATENT OFFICE 2,608,198

COMBINATION VEHICLE COVER AND TENT

William C. Goodman, Wichita, Kans.

Application May 5, 1949, Serial No. 91,431

4 Claims. (Cl. 135—4)

My invention relates to an improvement in a combination vehicle cover and tent. An object of my invention is to provide a vehicle cover that conforms somewhat to the shape of the vehicle that is to be covered and is provided with door portions that correspond with the door opening of the vehicle. The door portion having a flexible transportation therein to permit vision therethrough into or out of the vehicle when the cover is on the vehicle, or to admit light into the vehicle.

Another object of the invention is to provide a device of the kind mentioned that can be converted into a tent and the door portion of the cover will serve as a door for the tent. The cover, when used as a tent, is provided with an attachable and detachable wall extension portion to increase the height of the device when used as a tent so that one can stand up in the tent without his head striking the top of the tent.

A further object of the invention is to provide a device of the kind mentioned in which is included a collapsible frame, preferably made of a series of short sections of spring material that can be joined together and will support the tent, and will also spring into position or shapes that will conform to the general shape and proportions of the cover when used as a tent.

A still further object of the invention is to provide a frame of the kind mentioned that can readily and easily be assembled for use without the use of tools, and can also be attached or fastened to the ground without the use of tools unless the ground is too awfully hard.

A still further object of the invention is to provide a device of the kind mentioned that is light in weight, simple to assemble, and one that one person can easily handle and set up. These and other objects will be more fully explained as this description progresses.

Now referring to the accompanying drawings in which similar numerals of reference designate the same parts throughout the several figures of the drawings; Fig. 1 is a side view of my improved vehicle cover as it appears on a vehicle or passenger automobile.

Fig. 2 is a side view of the vehicle cover as it appears when the cover is converted to a tent.

Fig. 3 is a side view of the frame employed when the cover is converted into a tent.

Fig. 4 is a cross sectional view of the frame, the view being as seen from the line IV—IV in Fig. 3 and looking in the direction of the arrows.

Fig. 5 is an enlarged detail top plan view of one of the short frame sections.

Fig. 6 is a side view of one of the short frame sections shown in Fig. 5.

Fig. 7 is a top plan view of two of the short frame sections, shown in Figures 5 and 6, positioned together to form the cross points of the frame ribs and ridge of the tent frame.

Fig. 8 is an edge view of the ground leg element employed at the end of each frame rib assembly, and showing the last short frame section of a rib assembly attached thereto.

Fig. 9 is a side view of the tent poles, the pole being shown in its telescoped position for transporting or storage purposes.

Fig. 10 is a side view of one of the tent poles, the pole being shown in its extended position and being turned ninety degrees to that shown in Fig. 9.

In the drawings is shown a vehicle cover 15 that is made of textile or other suitable material, and is fashioned in somewhat of a symmetrical form that can be slipped over a vehicle, and that portion 15a of the cover 15 that covers the hood or engine portion of the vehicle will sag somewhat as shown at 15a in Fig. 1 to conform fairly closely to the shape of the vehicle.

The cover 15 has a door section 16, which, if desired, may have several such door sections that are so positioned as to fall in registry with the doors or door openings of the vehicle when the cover is placed over the vehicle. The door or doors 16 are preferably provided with a window that is cut out of the door material and covered with a flexible transparent material 17, such as a plastic material or the like, and then sewed or cemented to the door material to form a permanent and weather proof closure for the window opening. The edges of the inverted L-shaped cut 18 that outlines the door 16 are detachably joined together by any suitable device such as the well known slide fasteners 19, buttons, snap fasteners, hooks or the like.

The cover 15 may also be provided with windows such as shown at 20 and 21 that are constructed the same as the window 17 in the door 16. The windows such as 20 and 21 may be placed in any desirable place.

The cover 15 is preferably made of such height that it may be placed over a vehicle and the bottom edge of the cover will come to within a short distance of the ground. Due to the lowness of the design of the present day passenger automobile, a cover of my design for the automobile would not have sufficient height that it could be used as a tent as it would not have enough height that an average size person could stand up in the tent, therefore I have provided the lower or bottom edge of the cover 15 with a series of spaced apart eyelets 22a for use as will later be described.

Now if the cover 15 is to be used as a tent there will have to be a supporting means for the tent, therefore I have provided a collapsible supporting frame as shown in Figures 3 and 4.

The supporting means referred is a frame structure consisting of a series of duplicate frame elements 22. Each of the elements 22 are made of comparatively short lengths of strip spring material on each end of which is formed a longitudinally extending hook or Z-shaped element 23 that is narrower than the strip 22. Each end portion of each frame element 22 has a hole 24 therein that are so positioned that the hooks 23 on one end of each of two of the elements 22 may be simultaneously entered into the holes 24 of the adjoining element and so on, and the elements 22 slipped, each toward the other, so that the hooks 23 act to join each adjacent frame element 22 together to form a continuous springable frame unit that may be bent into curved tent supporting ribs such as shown at A, B, C and D.

Each end of each rib A, B, C and D is provided with a stationing or pin element 25, the upper end of which is provided with the conventional hook 23 and hole 24, the same as has the frame elements 22. The lower end of the pin element 25 is tapered to a sharp point 26 so that the pin 25 may be easily pressed into the ground. The upper or mid portion of the pin 25 is provided with a step element 27 that is rigidly attached, preferably welded, to the pin 25 so that the sharp point 26 may be placed on the ground and then the person erecting the tent frame may place his foot on the step 27 and press the sharp end 26 of the pin 25 into the ground to station the end of the frame rib A, B, C or D.

Some, or if desired, all of the frame elements 22 may be provided with a hole 28 in the central portion thereof whereby two of the elements 22 may be placed, one over the other and the hole 28 therein will come into registry with each other so that a bolt or pin may be passed through the holes 28 to join crossing tent ribs together at the top of the tent frame as will later be described.

The tent frame structure includes telescoping tent poles such as shown in Figures 9 and 10. The poles are made in sections E and F, the section F being slidably receivable in the section E. One end of the section F has a pin 29 thereon for purposes that will later be explained. The other end of the section F has a pin 30 passed therethrough and projects from opposite sides of the section F. One end of the section E has longitudinally positioned and diametrically disposed slots 31 and 32 therein in which the pin 30 is receivable.

When the pole is in its telescoped position the pin 29 in the end of the section F is slid into the section D until the pin 30 is seated in the slots 31 and 32 whereupon the pole is telescoped or shortened for transportation or storable purposes. When the pole is to be used for tent frame supporting purposes the pole may be prepared for use by slipping the pole section F from the pole section E and turning the pole section F end for end and inserting the pin 30 in the end of the pole section F into the slotted end of the pole section E until the pin 30 is again seated in the slots 31 and 32 whereupon the pole E—F is in its extended position and ready for use.

Now if the tent is to only be used temporarily, probably for sleeping purposes only and the height of the tent is of no importance, the frame may be assembled as shown in Figures 3 and 4 without the tent poles and by placing bolts through the holes 28 at the points where the ribs B, C and D cross the rib A, and only using enough of the sections 22 to make a frame of such height that the cover 15 may be placed thereover and the lower edge of the cover 15 will reach the ground.

If more height is desired in the tent, more of the sections 22 may be assembled to make a higher frame. In this case the tent poles may be used, one at each point where the frame ribs B, C and D cross rib A. In this case the poles may be positioned at the points of crossing of the ribs and the pole pin 29 may be passed through the registering holes 28 to station the ribs A, B, C and D relative to each other and the upper end of the poles E—F will support the ribs at the points of their crossing.

The frame having thus been assembled, the cover 15 may then be slipped over the frame with the lower edge of the cover 15 being spaced a considerable distance above the ground. If desired, the tent may be used in this condition to serve as a cover and having a ventilation or air space around the bottom of the tent. Now if it is desired to close this air space an additional strip of side wall material 33 may be employed to cover the opening. The upper edge of the supplementary side wall 33 may be supplied with suitable hooks 34 that may be hooked into the eyelets 22a, to support the supplemental side wall 33. The supplemental side wall 33 is cut at X and the adjoining ends at X of the supplemental side wall 33 are provided with what is a continuation of the slide portions device of the door section 16 so as to carry the door section 16 onto the ground and have a means of fastening the entire door closed.

While the device as shown and described is probably the preferred form of the device, it is to be understood that such modifications of the device may be employed as lie within the scope of the appended claims without departing from the spirit and intention of the invention. Now having fully shown and described my invention, what I claim is:

1. In a combination vehicle cover and tent device of the kind described; a flexible cover element, said cover element being fashioned to conform substantially to the shape of a vehicle to be covered and means for supporting the said cover element independent of the vehicle; said means for supporting the cover element independent of the vehicle being a frame work assembled of a multiplicity of duplicate frame sections, said frame sections being made of strips of spring material, each end of each of said strips having a Z-shaped hook formation longitudinally extending therefrom, said strips also having a hole therein adjacent each of said Z-shaped hook portions of the strip, said strips being joinable each with another by the Z-shaped hook portions of one strip being positioned through the hole in the adjacent strip to form continuous flexible rib elements of the said frame structure.

2. In a combination vehicle cover and tent device of the kind described; a flexible cover element, said cover element being fashioned to conform substantially to the shape of a vehicle to be covered and means for supporting the said cover element independent of the vehicle, said means for supporting the cover element independent of the vehicle being a frame work assembled of a multiplicity of duplicate frame sections, said frame sections being made of strips of spring material, each end of each of said strips having a Z-shaped formation longitudinally extending therefrom, said strips also having a hole therein adjacent each of said Z-shaped portions of the strip, said strips being joinable each with another by the Z-shaped portions of one strip being positioned through the hole in the adjacent strip to form continuous flexible rib elements of the said frame structure, said frame structure comprising a plurality of said rib elements, said rib elements being positioned to cross each other to form a frame of substantially the same shape as that of the said cover element, and means for positioning said ribs together at their points of crossing.

3. In a combination vehicle cover and tent device of the kind described; the structure defined in claim 2, and pole means for supporting the central portion of said frame structure at the points of crossing of the said ribs.

4. In a combination vehicle cover and tent device of the kind described; the structure defined in claim 2, and pole means for supporting the central portion of said frame structure at the points of crossing of the said ribs, said pole means comprising poles, each being made of two telescoping tubes, one end of one of said tubes having a tent pole pin longitudinally extending therefrom and the other end of the pole section having a pin passed therethrough and extending outwardly from opposite sides thereof, one end of the second of the pole sections having longitudinally positioned slots therein that are diametrically positioned across the end of the tube, the first said pole section being slidable within the second of said tubular pole sections and the last said pin being receivable in the said slots of the second said tubular pole section to hold the composite pole element in either extended or contracted positions.

WILLIAM C. GOODMAN.

REFERENCES CITED

The following references are of record in the file of this patent:

UNITED STATES PATENTS

| Number | Name | Date |
|---|---|---|
| 349,240 | Thomas | Sept. 14, 1886 |
| 971,613 | Hollister | Oct. 4, 1910 |
| 1,715,286 | Hardy | May 28, 1929 |
| 1,784,115 | Sebell | Dec. 9, 1930 |
| 1,836,060 | Barnes | Dec. 15, 1931 |
| 2,048,461 | Mosgoffian | July 21, 1936 |

FOREIGN PATENTS

| Number | Country | Date |
|---|---|---|
| 696,115 | Germany | Sept. 11, 1940 |